Sept. 30, 1969  S. ERGENC  3,470,065
PRODUCTION OF COLD NEUTRONS
Filed July 1, 1966  2 Sheets-Sheet 2

INVENTOR.
Sahabettin Ergenc
BY
ATTORNEYS

United States Patent Office 3,470,065
Patented Sept. 30, 1969

3,470,065
PRODUCTION OF COLD NEUTRONS
Sahabettin Ergenc, Zollikerberg, Zurich, Switzerland, assignor to Sulzer Brothers Limited, Winterthur, Switzerland, a Swiss company
Filed July 1, 1966, Ser. No. 562,310
Claims priority, application Switzerland, July 5, 1965, 9,455/65
Int. Cl. G21c 5/12; F25j 1/02; F25b 25/00
U.S. Cl. 176—39                                12 Claims

ABSTRACT OF THE DISCLOSURE

Cold neutrons are produced from the fission neutrons of a nuclear reactor in the moderator thereof with the aid of liquefied hydrogen deuteride circulated through a chamber in that moderator, the liquefied gas being obtained by compressing hydrogen or hydrogen deuteride gas, cooling and liquefying the compressed gas by countercurrent heat exchange flow with previously compressed and subsequently expanded gas, supercooling the condensed gas by evaporation of a fraction thereof expanded to intermediate pressure, passing the liquefield supercooled gas through a chamber in the moderator of the reactor, evaporating and superheating the liquefied gas emerging from the chamber by passing it in countercurrent heat exchange flow with newly compressed gas, expanding with performance of external work the evaporated and superheated gas and combining it with that fraction as evaporated in the supercooling step, and further heating the resulting combined stream of gas to the vicinity of ambient temperature preliminary to renewed compression thereof. There is also disclosed apparatus for carrying out the process.

---

Figure 1:
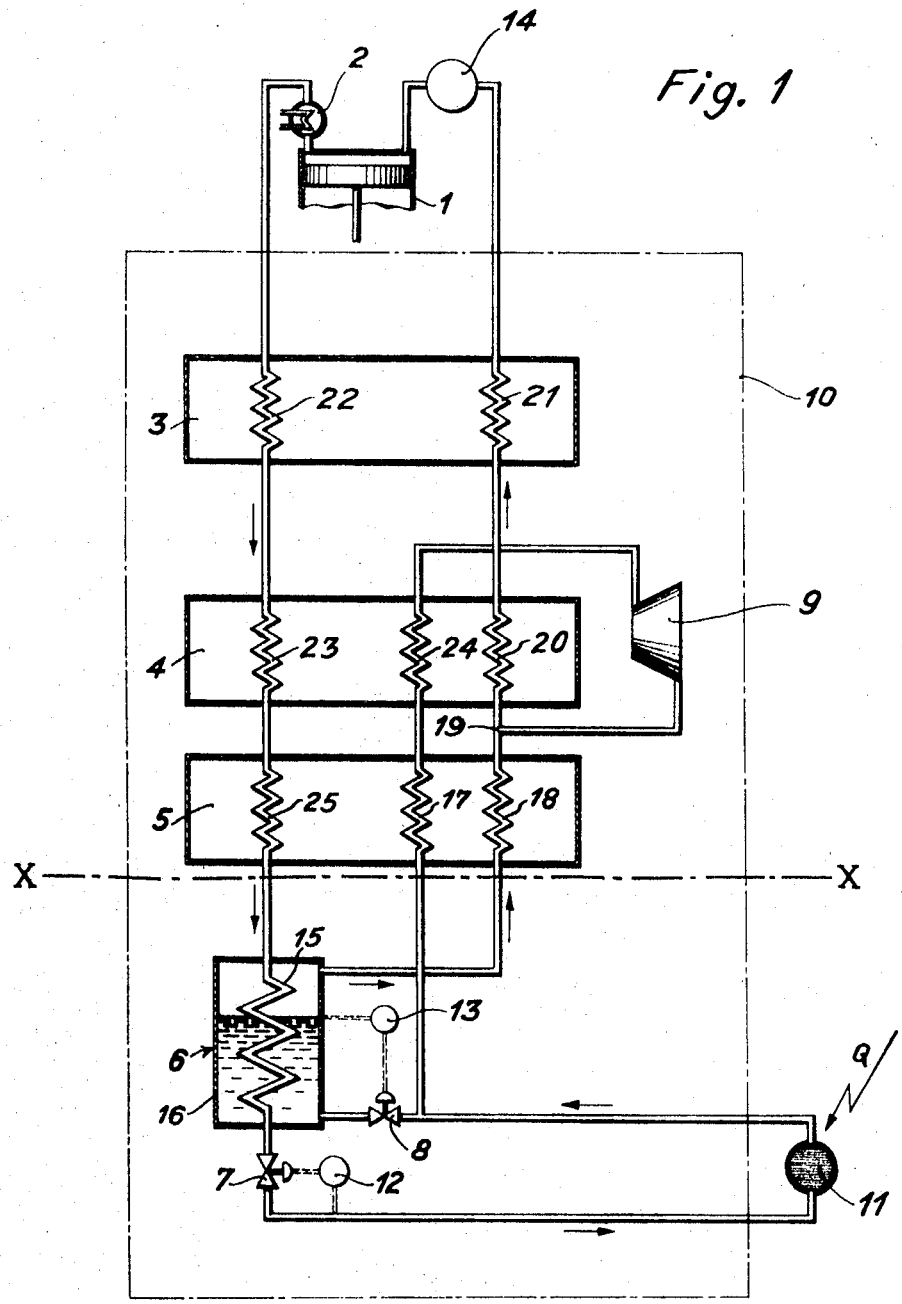

The present invention relates to the production of "cold" neutrons, i.e. neutrons of 0.005 electron volts or less, by means of liquefied gas of low boiling point. The invention provides a method and apparatus for this purpose in which liquefied and supercooled gas of low boiling point, such as hydrogen, is circulated through the moderator of a nuclear reactor by operation of the gas liquefaction process, without the requirement of any pump for handling that extremely low temperature liquid.

It has been heretofore proposed to develop a heavy stream of cold neutrons in a nuclear reactor by providing in a moderator, which may for example be made of graphite, and near the reactor core, a vessel filled with liquid phite, and near the reactor core, a vessel filled with liquid hydrogen and having relatively small dimensions compared to those of the reactor.[1] Hydrogen deuteride (HD) may be employed in such prior art apparatus as the moderator liquid in place of hydrogen. The liquefied hydrogen rises in temperature in the moderator vessel as a consequence of nuclear heating which occurs by the collisions of fast neutrons with atoms of hydrogen, by absorption of gamma rays in the liquid and in the walls of the vessel, and additionally by absorption of heat from the surroundings.

Since it is desirable that the liquid hydrogen be not vaporized in this heating process, it has been proposed to effect a corresponding cooling of the cold moderator liquid by means of cooling elements which are provided directly in contact with the moderator vessel or in the moderator liquid itself. These cooling devices however make the moderator vessel substantially heavier, so that heating of the moderator liquid as a result of gamma radiation is greater. The consequence is that the required refrigeration effect is likewise greater. Achievement of a greater refrigeration in turn acquires larger heat exchange surfaces for the cooling elements, in consequence of which the dimensions of the moderator vessel exposed to gamma radiation become still larger.

To obviate these disadvantages it has already been proposed to cause supercooled hydrogen to flow in a closed path through the moderator vessel, the liquid heated in the moderator vessel being pumped through a heat exchanger external thereto in which the heat to be removed is transferred to a refrigeration system. Thus in this arrangement it is necessary to provide a pump for circulating the liquid hydrogen. This however represents a substantial disadvantage since it has hitherto proved impossible to provide pumps for this purpose with the necessary dependability of operation, particularly in respect of lubrication of the bearings thereof.

It is an object of the invention to provide a method and apparatus for the production of cold neutrons with the aid of a liquefied and supercooled gas of low boiling point employed as the moderator liquid in a nuclear reactor without the requirement of any pump for circulation of the liquid hydrogen.

In accordance with the invention, the gas at room temperature is compressed to high pressure and is then cooled by countercurrent flow with gas which has passed through the moderator and which has thereafter been expanded. The compressed and cooled gas is then liquefied, and is thereafter supercooled by heat exchange with a fraction of the liquefied gas which has been expanded to the lowest pressure encountered in the system. After partial expansion the supercooled liquid so obtained is passed through the moderator of a nuclear reactor. In the course of this passage the supercooled liquefied gas is heated to the vicinity of its vaporizing temperature. It is thereupon vaporized by heat exchange with new gas at high pressure on it way to be liquefied. The vaporized gas in then superheated above its vaporization temperature, and is then expanded with performance of external work to the lowest pressure in the system. The gas so expanded is thereupon mixed with the now vaporized partial stream of liquefied gas employed for supercooling of the gas at high pressure, which partial stream has been vaporized in the course of that supercooling operation. Lastly, the gas at low pressure, i.e. the result of this mixing or combining operation, is heated to the vicinity of ambinent temperature by heat exchange with the gas newly compressed to high pressure, to be thereupon compressed for renewed passage through the cycle.

Advantageously, the partial stream of gas employed for supercooling of the liquefied gas at high pressure is drawn off from the stream of liquid downstream of the moderator and is reduced in pressure, by throttling, to the pressure of the gas in the main stream expanded with performance of work so that the two streams may be at the same pressure for recombination.

As already indicated, the refrigeration cycle is so constructed as to require no pump for circulation of the liquefied gas. Additionally, it is so constructed that the thermodynamic losses which occur in the heat exchangers and also the increase in entropy resulting from the necessary refrigeration are relatively small.

In this connection it is further to be noted that since the liquid gas is not to undergo vaporization upon absorption of heat in the moderator vessel, it must instead be vaporized at some point in the system outside thereof. It must thereafter be raised in temperature, compressed to high pressure, cooled, liquefied, and supercooled before being reintroduced into the moderator. Since the heat of vaporization of the liquefied gas is at least several times as great as the heat absorbed by the supercooled liquid in the moderator, the temperature differences existing in the ---
[1] See, e.g., "Technology and Uses of Liquid Hydrogen," 1964, Pergamon Press, Ch. 7.

condenser between the compressed but cooled gas on its way to the moderator (i.e. undergoing condensation) and the vaporizing liquid gas which has already been through the moderator must be held to as low values as possible. Otherwise the increase in entropy and the thermodynamic losses in the condenser will become excessive. According to the invention, the temperature differences between the vaporizing liquid and the condensing gas are made small by providing that the vaporizing liquid shall be at relatively high pressure even at that stage of the cycle. This pressure is, in particular, substantially higher than the equilibrium vapor pressure for the temperature at which the supercooled liquid enters the moderator load, this equilibrium vapor pressure being the lowest encountered in the cycle.

After the liquid passing from the moderator into the condenser has been completely vaporized there, the gas so developed, instead of being heated to ambient temperature, is in accordance with the invention superheated by heat exchange with gas at high pressure on its way to liquefaction and is then expanded with performance of external work. This has the advantage that no separate or supplementary flow cycle need be provided for the work-performing expansion. Any such supplementary cycle would increase the losses in the heat exchangers.

A further substantial advantage of the invention resides in the fact that the refrigeration effect to be produced at low temperature, i.e. in the range of temperatures between that at which the liquid enters the load and that at which it emerges therefrom, is produced not by a work-performing expansion in this range but rather by the cooling effect of a throttling operation.

The increase in entropy, i.e. the thermodynamic losses occurring in the course of a work-performing expansion of a gas—usually effected in one or more expansion turbines—is known to be, for a given exit pressure from the expansion, inversely related to the temperature at which that expansion takes place. On the contrary, the cooling effect of a throttling increases with falling temperature. In accordance with the invention therefore the work-performing expansion is carried out at a relatively high temperature, whereas the further refrigeration effect to be achieved at low temperatures is effected by means of throttling.

To this end a fraction of the refrigerant liquid which has passed through the moderator vessel is expanded by throttling to the output pressure of the gas undergoing expansion with performance of work, and is vaporized by heat exchange with the liquid to be supercooled.

The cooling effect of the throttling is determined by the condensing stream of gas at high pressure and by the stream of vaporizing liquid emerging from the moderator which is subsequently expanded with performance of work. This is true because there is required for supercooling of the liquid flowing as coolant into the moderator only a fraction small by comparison with either of these streams.

The favorable exploitation of the cooling effect produced by throttling is achieved in the invention in that the throttling effect, i.e. the difference in enthalpy between the streams of gas at high pressure and that expanded to intermediate pressure (both large in comparison with the fractional stream undergoing throttling), is employed at a relatively high pressure. This is done since, as is known, for the achievement of a specified cooling by throttling, the required work of compression of a refrigeration machine is inversely related to the range of pressures at which the throttling takes place.

Figure 2:
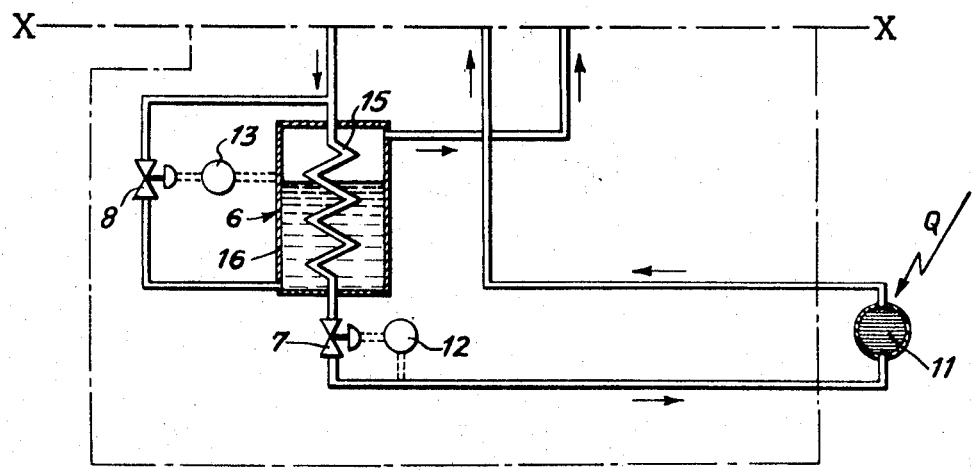

The invention will now be further described in terms of two presently preferred exemplary embodiments illustrated in the accompanying drawings, wherein FIG. 1 is a schematic flow diagram of apparatus in accordance with the invention for carrying out the method of the invention, i.e. for generating cold neutrons by passing a liquefied and supercooled gas of low boiling point through the moderator of a nuclear reactor, and FIG. 2 is a diagram similar to that of FIG. 1 but showing, for the components of FIG. 1 below the line X—X of FIG. 1, a modified construction.

The principal elements of the system shown in FIG. 1 of the drawing are a compressor 1, a cooler 2 for dissipation of the heat of compression, counterflow heat exchangers 3, 4 and 5, a supercooler generally indicated at 6, throttling elements 7 and 8, and an expansion turbine 9. The portion of the system below ambient temperature is insulated by means of a vacuum vessel schematically indicated at 10, within which there is maintained a pressure of for example $10^{-4}$ mm. of mercury. The load on the refrigeration system shown is a moderator vessel 11 which is disposed, in a matter not indicated in the drawing, within a nuclear reactor. The load may of course comprise a plurality of moderator vessels connected in parallel.

The end to be achieved with the system illustrated is the production of a sufficient rate of flow of supercooled moderator liquid for passage through the moderator vessel in a closed cycle of flow. Consequently, the liquid must not be allowed to vaporize in the moderator vessel in the process of abstracting heat therefrom. The difference between the temperature at which the liquid enters the moderator and that at which it leaves it is essentially determined by the permissible pressures.

The lower limit for the inlet temperature is specified by the temperature of the mixture of vapor and liquid which exists, in the coil 15 of supercooler 6, in heat exchange relation with the vaporizing liquid in the supercooler vessel 16 surrounding that coil, and which liquid has just passed through the moderator. The liquid vaporized in the vessel 16 exists, neglecting pressure losses in the lines, at the lowest pressure found in the system, namely that of the gases leaving the turbine 9 after expansion therein. This pressure may advantageously be of one atmosphere. A lower entry temperature might be achieved if the lowest pressure in the system were below one atmosphere. This is however undesirable because of the possibility of contamination of the system by entry of air thereinto. Moreover, this would require substantial increase in the size of the compressor since for a given quantity of gas to be circulated, the suction volume increases with declining suction pressure, i.e., input pressure to the compressor.

The exit temperature from the moderator vessel 11 is specified by the equilibrium vapor pressure of the liquid at that temperature. Since this pressure is limited by the maximum permissible pressure in the moderator vessel, i.e., by constructional considerations, the exit temperature has an upper as well as a lower limit.

The mode of operation of the system shown in the drawing will now be described. The gas compressed in the compressor 1 is freed from its heat of compression in the cooler 2 and is then cooled in the coils 22 and 23 of heat exchangers 3 and 4 by heat exchange with previously expanded gas of the cycle, e.g., that passing upwardly through coils 21, 20 and 24. The gas at high pressure is then further cooled and is condensed in coil 25 of heat exchanger 5, by counterflow heat exchange with vaporizing liquid arriving from the moderator and passing through coils 17 and 18. The condensed high pressure gas is thereupon supercooled in the coil 15 of supercooler 6 and is then expanded by throttling in the valve 7 to an intermediate pressure corresponding to the pressure desired in the moderator vessel 11. By operation of a control device 12 this valve maintains constant the input pressure to the moderator vessel. The expanded and supercooled liquid thereupon flows through the vessel 11, in which it is raised in temperature to the vicinity of its temperature of vaporization at that pressure. The greater part of the liquid so passing through the vessel 11 then flows through coil 17 of the heat exchanger 5 in which it is vaporized from the heat of the condensing gas at high pressure flowing through coil 25. At the upper end of this exchanger and in the coil 24 of exchanger 4 the gas so developed is superheated, and it is then expanded in an expansion turbine 9 with reduction in pressure down to the lowest pressure in the system, in the course of which expansion the gas is cooled. Obviously plural turbines may be employed for expansion of the gas with performance of external work.

The remainder of the liquid emerging from the vessel 11 is reduced in pressure by throttling in the valve 8, down to the pressure of the gas expanded in the turbine 9, and it then flows into the vessel 16 of supercooler 6 where it is vaporized, thereby supercooling the condensed gas at high pressure in the coil 15. In order to maintain constant during operation of the plant the effective size of the heat exchange surfaces between the condensing gas at high pressure (in coil 15) and the liquid in vessel 16 employed for supercooling of that condensing gas, the liquid level is held constant in the supercooler by means of a level control device 13 operating on the valve 8.

As already hereinabove indicated, there is employed in vessel 16 for supercooling of the condensed high pressure gas a quantity of liquid small compared to that which is employed in the coil 17 for condensation of the high pressure gas in the heat exchanger 5. Optionally, the liquid employed for supercooling can be drawn off as a fraction from the stream of condensed high pressure gas either upstream or downstream of the supercooler, this fraction being expanded by throttling to low pressure and then introduced into the supercooler. This modification is illustrated in FIG. 2, where the throttling valve 8, controlled as before by the liquid level responsive device 13, admits to the vessel 16 a fraction of the condensed gas emerging from coil 25 of exchanger 5.

In the embodiments of both figures, the liquid vaporized in the vessel 16 of supercooler 6 is raised in temperature on passage through coil 18 of heat exchanger 5, up to the temperature of the gas expanded with performance of external work in turbine 9, and it is thereupon mixed with the latter gas at point 19. The resulting stream of gas, flowing through coils 20 and 21 of the exchangers 4 and 3, is there heated, by heat exchange with gas at high pressure (shown flowing downwardly in the drawing through coils 22 and 23), approximately to ambient level before it is returned to the low-pressure side of the compressor (the right-hand side thereof in the drawing).

A gas-holding vessel 14 is advantageously provided in the suction line of the compressor in order that even when the system is shut down, the gas in the system may rise to ambient temperature without generating excessive pressures.

NUMERICAL EXAMPLE

In the apparatus of FIG. 1, gaseous hydrogen is compressed in compressor 1 to a pressure of 10 atomspheres at a rate of 100 grams per second and is then cooled to about 45° K. in the exchangers 3 and 4. The hydrogen, condensing at 31.4° K. in the heat exchanger 5, is then supercooled to a temperature of 21.6° K. in the supercooler 6, and is lastly expanded to a pressure of 3 atmospheres in the throttling valve 7. The inlet temperature of the liquid hydrogen into the moderator vessel 11 amounts to about 22° K. and its temperature upon exit therefrom is 24° K. A fraction of the flow through the vessel 11 to be employed for supercooling and amounting to 8 grams per second is expanded in the throttling valve 8 to a pressure of something more than one atmosphere, in the course of which it is cooled to about 21° K. The balance of the liquid hydrogen emerging from the vessel 11, amounting to 92 grams per second, is vaporized in the coil 17 of heat exchanger 5, emerging therefrom at a temperature of 43° K., and is further superheated in the coil 24 of exchanger 4 to some 53° K. It is then expanded in the expansion turbine 9 to a pressure somewhat above one atmosphere, in which process the gas temperature falls to 43° K. On emerging from turbine 9 the 92 grams per second stream of gas expanded with performance of external work is reunited with the 8 grams per second stream which has passed from the supercooler and though coil 18 of exchanger 5. The resulting combined stream passes through coil 20 of exchanger 4, emerging therefrom at a temperature of 53° K. After being heated substantially to ambient temperature in coil 21 of exchanger 3, this combined stream is aspirated by the suction side of the compressor 1 through the equalization vessel 14.

The invention thus provides a method of producing cold neutrons which comprises compressing a gas of low boiling point, preferably hydrogen, cooling and liquefying the gas by countercurrent heat exchange flow with previously compressed and subsequently expanded gas, supercooling the condensed gas by evaporating a fraction of the condensed gas expanded to intermediate pressure, passing the liquefied supercooled gas through the moderator of a nuclear reactor, evaporating and superheating the liquefied gas emerging from the moderator by passing it in countercurrent heat exchange flow with newly compressed gas, expanding with performance of external work the evaporated and superheated gas and combining it with that fraction as evaporated in the supercooling step, and further heating the resulting combined stream of gas to the vicinity of ambient temperature preliminary to renewed compression thereof.

In this method, the gas fraction employed for supercooling may be divided off either upstream or downstream of the moderator. Preferably, the gas fraction employed for supercooling is, by countercurrent flow in heat exchange relation with gas at high pressure, raised in temperature to that of the gas expanded by performance of external work prior to combination with the gas so expanded.

Desirably, the liquid part of the gas fraction employed for supercooling is held constant, as is also the pressure of the liquefied gas at its entry into the moderator.

The invention thus also provides apparatus for the production of cold neutrons. This apparatus comprises means to compress a gas of low boiling point, and, in exchanger 4, first countercurrent flow heat exchange means connected to cool the gas so compressed by countercurrent flow heat exchange with previously compressed and expanded gas. It further comprises, in exchanger 5, second countercurrent flow heat exchange means connected to liquefy the compressed gas so cooled by flow in countercurrent flow heat exchange relation with previously compressed and expanded gas. It then comprises, in supercooler 6, means to supercool the liquefied gas by evaporation of a fraction of the gas so liquefied. Conduit means are then provided to pass the supercooled liquefied gas through the moderator of a nuclear reactor, to pass the liquefied gas emerging from the moderator through that second heat exchange means for evaporation thereof and to pass that evaporated gas through the first heat exchange means for superheating thereof. An expansion turbine 9 is then provided to expand the superheated gas with performance of external work, and conduit means are provided to combine the gas so expanded with the evaporated fraction prior to renewed compression of the gas stream so combined. This apparatus desirably includes a liquid level responsive device 13 to hold constant the level of liquefied gas undergoing evaporation in the supercooler 6, and also the pressure-responsive device 12 to hold constant the pressure of the liquefied supercooled gas on entry into the moderator.

While the invention has been described hereinabove in terms of the presently preferred practice and embodiments thereof, the invention itself is not limited thereto. For example, for purposes of clarity the flow of the gases and liquids through the heat exchangers has been described in terms of parts of those exchangers identified as coils. The heat exchangers may however be of any suitable construction for the exchange of heat among two or more streams of fluid, and need not include coils for that purpose. More generally, the invention includes all modifications on and departures from the methods and structures hereinabove described which properly fall within the spirit and scope of the appended claims.

I claim:
1. A method of producing cold neutrons from the fission neutrons of a nuclear reactor with the aid of a liquefied gas taken from the class consisting of hydrogen and hydrogen deuteride circulated through a chamber disposed in the moderator of the reactor wherein said fission neutrons are generated, said method comprising compressing a gas taken from the class consisting of hydrogen and hydrogen deuteride, cooling and liquefying the compressed gas by countercurrent heat exchange flow with previously compressed and subsequently expanded gas, supercooling the condensed gas by evaporation of a fraction of the condensed gas expanded to intermediate pressure, passing the liquefied supercooled gas through a chamber in the moderator of the nuclear reactor, evaporating and superheating the liquefied gas emerging from said chamber by passing it in countercurrent heat exchange flow with newly compressed gas, expanding with performance of external work the evaporated and superheated gas and combining it with said fraction as evaporated in said supercooling step, and further heating the resulting combined stream of gas to the vicinity of ambient temperature preliminary to renewed compression thereof.

2. The method of claim 1 wherein the gas fraction employed for supercooling is divided off downstream of said chamber.

3. The method of claim 1 wherein the gas fraction employed for supercooling is divided off upstream of said chamber.

4. The method of claim 1 wherein the gas fraction employed for supercooling is, by countercurrent flow in heat exchange relation with gas at high pressure, raised in temperature to that of the gas expanded by performance of external work prior to combination with the gas so expanded.

5. The method of claim 1 including the further step of holding constant the liquid part of the gas fraction employed for supercooling.

6. The method of claim 1 including the further step of holding constant the pressure of the liquefied gas at its entry into said chamber.

7. Apparatus for the production of cold neutrons from the fission neutrons of a nuclear reactor, said apparatus comprising means to compress a gas taken from the class consisting of hydrogen and hydrogen deuteride, first countercurrent flow heat exchange means connected to cool the gas so compressed by countercurrent flow heat exchange with previously compressed and expanded gas, second countercurrent flow heat exchange means connected to liquefy the so compressed and cooled gas by flow in countercurrent flow heat exchange relation with previously compressed and expanded gas, means to supercool the gas so liquefied by evaporation of a fraction of the gas so liquefied, means to pass the supercooled liquefied gas through a chamber in the moderator of said nuclear reactor, means to pass the liquefied gas emerging from said chamber through said second heat exchange means for evaporation thereof, means to pass said evaporated gas through said first heat exchange means for superheating thereof, means to expand said superheated gas with performance of external work, and means to combine the gas so expanded with performance of external work with said evaporated fraction prior to renewed compression of the gas stream so combined.

8. Apparatus according to claim 7 including means downstream of said chamber to draw off and expand to intermediate pressure for use in said supercooling means part of the liquefied gas emerging from said chamber.

9. Apparatus according to claim 7 including means upstream of said chamber to draw off and expand to intermediate pressure for use in said supercooling means part of the liquefied gas obtained from said second heat exchange means.

10. Apparatus according to claim 7 including means to heat the gas evaporated in said supercooling means upstream of said combining means.

11. Apparatus according to claim 7 further including means to hold constant the level of liquefied gas undergoing evaporation in said supercooling means.

12. Apparatus according to claim 7 including means to hold constant the pressure of the liquefied supercooling gas on entry into said chamber.

References Cited

UNITED STATES PATENTS

| | | | |
|---|---|---|---|
| 3,118,751 | 1/1964 | Seidel | 62—39 X |
| 3,355,903 | 12/1967 | La Fleur | 62—402 X |

OTHER REFERENCES

J. Technology and Uses of Liquid Hydrogen, edited by R. B. Scott, MacMillian and Co., N.Y., 1964, pp. 195, 196, 198, 210, 211, 216 (part of article by F. J. Webb).

REUBEN EPSTEIN, Primary Examiner

U.S. Cl. X.R.

62—9, 39, 402, 403; 176—41, 50